(12) United States Patent
Takata et al.

(10) Patent No.: US 12,371,321 B2
(45) Date of Patent: Jul. 29, 2025

(54) HYDROGEN SEPARATION FILTER AND METHOD FOR MANUFACTURING HYDROGEN SEPARATION FILTER

(71) Applicant: TOYOTA JIDOSHA KABUSHIKI KAISHA, Toyota (JP)

(72) Inventors: Satoshi Takata, Toyota (JP); Tomonari Kogure, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 511 days.

(21) Appl. No.: 17/973,929

(22) Filed: Oct. 26, 2022

(65) Prior Publication Data

US 2023/0212008 A1    Jul. 6, 2023

(30) Foreign Application Priority Data

Nov. 19, 2021 (JP) ................. 2021-188766
Mar. 18, 2022 (JP) ................. 2022-044451

(51) Int. Cl.
*C01B 3/50* (2006.01)
*B01D 39/20* (2006.01)
*B01D 71/02* (2006.01)

(52) U.S. Cl.
CPC .......... *C01B 3/503* (2013.01); *B01D 39/2051* (2013.01); *B01D 71/022* (2013.01);
(Continued)

(58) Field of Classification Search
CPC ........... B01D 2256/16; B01D 39/2051; B01D 2325/021; B01D 2325/52; B01D 69/02;
(Continued)

(56) References Cited

U.S. PATENT DOCUMENTS 5,139,541 A * 8/1992 Edlund ................. C01C 1/0405
95/56
5,451,386 A * 9/1995 Collins ................ B01D 53/228
423/658.2
(Continued)

FOREIGN PATENT DOCUMENTS

JP    2017-124364 A    7/2017

*Primary Examiner* — Robert Clemente
(74) *Attorney, Agent, or Firm* — Oliff PLC

(57) ABSTRACT

Provided is a hydrogen separation filter allowing a hydrogen purification at a lower temperature than conventional one, and a method for manufacturing the same. A hydrogen separation filter includes a porous substrate, a lattice expansion layer formed on the porous substrate and containing a first material, and a hydrogen dissociation and transmission layer formed on the lattice expansion layer and containing a second material selected from the group consisting of Pd, V, Ta, Ti, Nb, and alloys thereof. The first material and the second material have a same crystalline structure. A lattice constant $a_{1,\ bulk}$ of a first bulk material having a same composition and a same crystalline structure as the first material and a lattice constant $a_{2,\ bulk}$ of a second bulk material having a same composition and a same crystalline structure as the second material satisfy a formula (1):

$$1.03 a_{2,\ bulk} \leq a_{1,\ bulk} \leq 1.15 a_{2,\ bulk} \qquad (1).$$

15 Claims, 4 Drawing Sheets

(52) U.S. Cl.
CPC ...... *C01B 3/505* (2013.01); *B01D 2239/0478* (2013.01); *B01D 2239/1208* (2013.01); *B01D 2239/1291* (2013.01); *B01D 2256/16* (2013.01); *C01B 2210/0012* (2013.01); *C01B 2210/0042* (2013.01)

(58) Field of Classification Search
CPC .... B01D 67/0069; B01D 71/022; C01B 3/50; C01B 3/501; C01B 3/503; C01B 3/505; C01B 3/506; C01B 2210/0012; C01B 2210/0042
See application file for complete search history.

(56) References Cited

U.S. PATENT DOCUMENTS

| | | | | |
|---|---|---|---|---|
| 2003/0000387 | A1* | 1/2003 | Uemura | B01D 71/02231 96/11 |
| 2003/0183080 | A1* | 10/2003 | Mundschau | C01B 3/16 95/55 |
| 2005/0241477 | A1* | 11/2005 | Mundschau | C01B 3/503 95/56 |
| 2013/0243660 | A1* | 9/2013 | Kim | C01B 3/503 95/56 |
| 2022/0410077 | A1* | 12/2022 | Serra Alfaro | C04B 41/52 |
| 2024/0042378 | A1* | 2/2024 | Takata | C01B 3/503 |
| 2024/0359978 | A1* | 10/2024 | Takata | C01B 3/501 |

\* cited by examiner

HYDROGEN SEPARATION FILTER AND METHOD FOR MANUFACTURING HYDROGEN SEPARATION FILTER

CROSS REFERENCE TO RELATED APPLICATIONS

The present application claims priority from Japanese patent applications JP 2021-188766 filed on Nov. 19, 2021 and Japanese patent application JP 2022-044451 filed on Mar. 18, 2022, the entire contents of which are hereby incorporated by reference into this application.

BACKGROUND

Technical Field

The present disclosure relates to a hydrogen separation filter and a method for manufacturing a hydrogen separation filter.

Background Art

As a hydrogen purification method, there has been known a membrane separation process using a metal film. JP 2017-124364 A discloses a hydrogen separation membrane obtained by forming a palladium thin film or a palladium alloy thin film on a surface of a porous filter including a porous metal substrate and a ceramic porous body that covers pores of the porous metal substrate.

SUMMARY

Examples of metal that allows selective transmission of hydrogen include palladium (Pd), vanadium (V), tantalum (Ta), titanium (Ti), and niobium (Nb). These metals easily embrittle in a hydrogen atmosphere. To suppress the embrittlement, these metals are used at a high temperature (for example, about 400° C.). However, a hydrogen purification under the high temperature requires a large amount of energy.

The present disclosure provides a hydrogen separation filter allowing a hydrogen purification at a lower temperature than conventional one, and a method for manufacturing the same.

The present disclosure includes the following aspects.

1. A hydrogen separation filter comprises a porous substrate, a lattice expansion layer, and a hydrogen dissociation and transmission layer. The lattice expansion layer is formed on the porous substrate. The lattice expansion layer contains a first material. The hydrogen dissociation and transmission layer is formed on the lattice expansion layer. The hydrogen dissociation and transmission layer contains a second material selected from the group consisting of Pd, V, Ta, Ti, Nb, and alloys thereof. The first material and the second material have a same crystalline structure. A lattice constant $a_{1,\,bulk}$ of a first bulk material having a same composition and a same crystalline structure as the first material and a lattice constant $a_{2,\,bulk}$ of a second bulk material having a same composition and a same crystalline structure as the second material satisfy a formula (1):

$$1.03 a_{2,\,bulk} \leq a_{1,\,bulk} \leq 1.15 a_{2,\,bulk} \tag{1}$$

2. In the hydrogen separation filter according to Aspect 1, a lattice constant $a_2$ of the second material has a lattice constant $a_2$ satisfying a formula (2):

$$a_{2,\,bulk} < a_2 \tag{2}$$

the lattice constant $a_2$ being obtained from a lattice spacing between crystal planes perpendicular to an interface between the lattice expansion layer and the hydrogen dissociation and transmission layer.

3. In the hydrogen separation filter according to Aspect 1, the second material has a lattice constant $a_2$ satisfying a formula (3):

$$1.5 \leq [(a_2 - a_{2,\,bulk})/a_{2,\,bulk}] \times 100 \leq 3.6 \tag{3}$$

the lattice constant $a_2$ being obtained from a lattice spacing between crystal planes perpendicular to an interface between the lattice expansion layer and the hydrogen dissociation and transmission layer.

4. In the hydrogen separation filter according to any one of Aspects 1 to 3, a lattice constant $a_{2,\,interface}$ of the second material in an interface between the lattice expansion layer and the hydrogen dissociation and transmission layer and a lattice constant $a_{2,\,surface}$ of the second material in a surface of the hydrogen dissociation and transmission layer satisfy a formula (4):

$$0.98 \leq a_{2,\,surface}/a_{2,\,interface} \leq 1 \tag{4}$$

the lattice constant $a_{2,\,interface}$ being obtained from a lattice spacing between crystal planes perpendicular to the interface, and the lattice constant $a_{2,\,surface}$ being obtained from a lattice spacing between crystal planes perpendicular to the interface.

5. In the hydrogen separation filter according to any one of Aspects 1 to 4, the hydrogen dissociation and transmission layer has a thickness in a range of 10 nm to 350 nm.

6. In the hydrogen separation filter according to any one of Aspects 1 to 5, the first material is Ag, Au, or Al, and the second material is Pd.

7. In the hydrogen separation filter according to Aspect 6, the first material is Ag.

8. In the hydrogen separation filter according to any one of Aspects 1 to 7, the lattice expansion layer and the hydrogen dissociation and transmission layer have a total thickness exceeding seven times of a pore diameter of the porous substrate.

9. The hydrogen separation filter according to any one of Aspects 1 to 5 further comprises a hydrogen release layer containing a third material and formed between the porous substrate and the lattice expansion layer, the third material having a binding energy with hydrogen in a range of 230 kJ/mol H to 270 kJ/mol H.

10. In the hydrogen separation filter according to Aspect 9, the third material has a same crystalline structure as the first material and the second material.

11. In the hydrogen separation filter according to Aspect 10, a lattice constant $a_{3,\,bulk}$ of a third bulk material having a same composition and a same crystalline structure as the third material satisfies a formula (5):

$$0.8 a_{1,\,bulk} \leq a_{3,\,bulk} \leq 1.0 a_{1,\,bulk} \tag{5}$$

12. In the hydrogen separation filter according to any one of Aspects 9 to 11, the first material is Ag, the second material is Pd, and the third material is Cu or Ni.

13. In the hydrogen separation filter according to any one of Aspects 9 to 11, the first material is Nb, W, or Mo, the second material is V, and the third material is Fe.

14. A method for manufacturing the hydrogen separation filter according to any one of Aspects 1 to 13 comprises depositing the first material and the second material sequentially on the porous substrate with an evaporation method under a pressure in a range of $1\times10^{-6}$ Pa to $1\times10^{-4}$ Pa.

15. A method for manufacturing the hydrogen separation filter according to any one of Aspects 9 to 12 comprises: forming the hydrogen release layer by depositing Cu as the third material on the porous substrate with an electroless plating method using a copper plating solution containing polyethylene glycol with a concentration in a range of 20 ppm to 40 ppm; forming the lattice expansion layer by depositing the first material on the hydrogen release layer with an evaporation method; and forming the hydrogen dissociation and transmission layer by depositing the second material on the lattice expansion layer with the evaporation method.

The hydrogen separation filter of the present disclosure allows the hydrogen purification at the lower temperature than conventional one.

DETAILED DESCRIPTION

Figure 1:
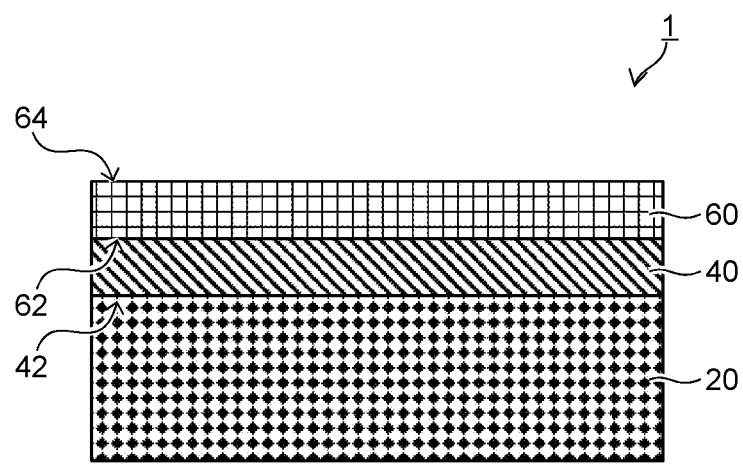
FIG. 1 is a schematic cross-sectional view of a hydrogen separation filter according to an embodiment.

The following describes embodiments with reference to the drawings as necessary. In the drawings referred in the following description, the same reference numerals are attached to the same members or the members having similar functions, and their repeated explanations will be omitted in some cases. For convenience of explanation, dimensional ratios and shapes of respective units in the drawings are exaggerated, and different from actual dimensional ratios and shapes in some cases. In this application, a numerical range expressed using the term "to" includes respective values described before and after the term "to" as the lower limit value and the upper limit value. In this application, the term "perpendicular" not only means to be accurately perpendicular, but includes to be approximately perpendicular, and the term "parallel" not only means to be accurately parallel, but includes to be approximately parallel. In this application, the term "on" includes both of "directly on" and "indirectly on" insofar as it is not especially specified in the context.

I. Embodiment

A hydrogen separation filter 1 according to an embodiment illustrated in FIG. 1 includes a porous substrate 20, a lattice expansion layer 40 formed on the porous substrate 20, and a hydrogen dissociation and transmission layer 60 formed on the lattice expansion layer 40. In this embodiment, the lattice expansion layer 40 may be formed directly on the porous substrate 20, and the hydrogen dissociation and transmission layer 60 may be formed directly on the lattice expansion layer 40.

The porous substrate 20 may be made of, for example, a metal, a metal oxide, or a resin, and may be made of a metal oxide because of its high durability. Examples of metal oxide include aluminum oxide, zirconium oxide, and zeolite. Especially, aluminum oxide is used in some embodiments because of its inexpensiveness. The porous substrate 20 may have any shape such as a flat plate shape and a cylindrical shape.

The porous substrate 20 is provided with pores through which hydrogen is allowed to pass. The pores are obstructed by the lattice expansion layer 40 and the hydrogen dissociation and transmission layer 60. The pores may have an average diameter in a range of, for example, 1 nm to 100 nm. With the pore diameter in the above-described range, the porous substrate 20 has a sufficient hydrogen permeability, and the pores are easily obstructed by the lattice expansion layer 40 and the hydrogen dissociation and transmission layer 60 without excessively thickening the lattice expansion layer 40 or the hydrogen dissociation and transmission layer 60. The pore diameter may be ½ or less the total thickness of the hydrogen dissociation and transmission layer 60 and the lattice expansion layer 40. Here, a pore diameter distribution of the porous substrate 20 can be obtained by mercury porosimetry according to Japanese Industrial Standard R 1655:2003. The mercury porosimetry is a method in which mercury is infiltrated into open pores by applying a pressure, a relation between a volume of the mercury infiltrated into the open pores and a pressure value applied at the time is obtained, and the obtained relation is used to determine diameters of the open pores with a formula of Washburn's equation assuming that the open pores have columnar shapes.

The porous substrate 20 may have a porosity in a range of 30% to 50%. This allows the porous substrate 20 to have the sufficient hydrogen permeability while maintaining a sufficient mechanical strength.

The lattice expansion layer 40 contains a first material, consists essentially of the first material, or consists of the first material. The hydrogen dissociation and transmission layer 60 contains a second material, consists essentially of the second material, or consists of the second material. In this application, the term "contain" means that an additional component may be contained, and encompasses the term "consist" and the term "consist essentially of." The term "consist essentially of" means that an additional component that substantially does not adversely affect the function of the lattice expansion layer 40 or the hydrogen dissociation and transmission layer 60 may be contained. The term "consist of" means containing only the described material, but does not exclude containing inevitable impurities.

The second material contained in the hydrogen dissociation and transmission layer 60 is selected from the group consisting of Pd, V, Ta, Ti, Nb, and alloys thereof. The hydrogen dissociation and transmission layer 60 causes dissociative adsorption of hydrogen molecules on its surface 64 to generate hydrogen atoms. The hydrogen atoms diffuse in the hydrogen dissociation and transmission layer 60 and reach an interface 62 between the lattice expansion layer 40 and the hydrogen dissociation and transmission layer 60, further diffuse in the lattice expansion layer 40, recombine to form hydrogen molecules on an interface 42 between the lattice expansion layer 40 and the porous substrate 20, and leave the lattice expansion layer 40. The hydrogen molecules pass through the porous substrate 20, and then leave the hydrogen separation filter 1. This is how the hydrogen separation filter 1 selectively transmits hydrogen. Especially, Pd is appropriate as the second material because Pd has a high hydrogen dissociation and permeation capacity even at a low temperature of 300° C. or less.

The first material contained in the lattice expansion layer 40 has the same crystalline structure as the second material. The first material in the lattice expansion layer 40 and the second material in the hydrogen dissociation and transmission layer 60 may have the same crystal orientation.

A first bulk material having the same composition and the same crystalline structure as the first material has a lattice constant $a_{1,\,bulk}$, and a second bulk material having the same composition and the same crystalline structure as the second material has a lattice constant $a_{2,\,bulk}$, the lattice constant $a_{1,\,bulk}$ and the lattice constant $a_{2,\,bulk}$ satisfying a formula (1):

$$1.03a_{2,\,bulk} \leq a_{1,\,bulk} \leq 1.15a_{2,\,bulk} \quad (1).$$

When the first material and the second material has the crystalline structure other than cubic system, the lattice constants of the same crystallographic axes of the first material and the second material satisfy the formula (1). Here, the bulk material means a completely relaxed material, which is free-standing (i.e., not supported by another member). Since the first material and the second material have the same crystalline structure and have the compositions that allows the formula (1) to be satisfied, a lattice constant $a_2$ of the second material in the hydrogen dissociation and transmission layer 60 can be made larger than the lattice constant $a_{2,\,bulk}$ of the second bulk material.

For example, when the second material is Pd having a face-centered cubic (fcc) structure, the first material may be Al, Au, or Ag having the fcc structure, and may be especially Ag because Ag is relatively inexpensive and less likely to be oxidized. When the second material is V having a body-centered cubic (bcc) structure, the first material may be Mo, W, or Nb having the bcc structure. When the second material is Ta having the bcc structure, the first material may be V, Mo, W, or Nb having the bcc structure. Table 1 illustrates the lattice constants of the bulk materials of these metals.

TABLE 1

| Metal | Crystalline Structure | Lattice Constant of Bulk Material [nm] |
|---|---|---|
| Pd | fcc | 0.38898 |
| Al | fcc | 0.40496 |
| Au | fcc | 0.40786 |
| Ag | fcc | 0.40862 |
| Ta | bcc | 0.28665 |
| V | bcc | 0.30300 |
| Mo | bcc | 0.31399 |
| W | bcc | 0.31560 |
| Nb | bcc | 0.32941 |

The lattice constant $a_2$ of the second material in the hydrogen dissociation and transmission layer 60 satisfies a formula (2):

$$a_{2,\,bulk} < a_2 \quad (2),$$

Especially, the lattice constant $a_2$ of the second material may satisfy a formula (3):

$$1.5 \leq [(a_2 - a_{2,\,bulk})/a_{2,\,bulk}] \times 100 \leq 3.6 \quad (3),$$

Here, the lattice constant $a_2$ of the second material means a lattice constant obtained from a lattice spacing between crystal planes perpendicular to the interface 62 between the lattice expansion layer 40 and the hydrogen dissociation and transmission layer 60. In detail, electron diffraction patterns of the second material in or in the vicinity of the surface 64 of the hydrogen dissociation and transmission layer 60, in or in the vicinity of the interface 62 between the lattice expansion layer 40 and the hydrogen dissociation and transmission layer 60, and in an intermediate position of them are obtained by using a transmission electron microscope (TEM). The lattice constant is determined from the lattice spacing between the crystal planes perpendicular to the interface 62 between the lattice expansion layer 40 and the hydrogen dissociation and transmission layer 60 based on each of the electron diffraction patterns. The obtained lattice constants are averaged to produce the lattice constant $a_2$ of the second material. The formula (2) indicates that a crystal lattice of the second material in the hydrogen dissociation and transmission layer 60 expands at least in a direction parallel to the interface 62 compared with a fully relaxed state of the crystal lattice. The crystal lattice of the second material in the hydrogen dissociation and transmission layer 60 may expand also in a direction perpendicular to the interface 62. Conventionally, when hydrogen diffuses in the crystal lattice of the hydrogen dissociation and transmission layer at low temperature, the crystal lattice repeatedly expands and contracts, thereby causing embrittlement. However, in the hydrogen separation filter 1 according to the embodiment, the expanded crystal lattice of the hydrogen dissociation and transmission layer 60 reduces the expansion and contraction of the crystal lattice due to the hydrogen diffusion, thereby preventing or reducing the embrittlement of the hydrogen dissociation and transmission layer 60 at low temperature. Therefore, the hydrogen separation filter 1 according to the embodiment allows the hydrogen purification at the lower temperature than conventional one.

A lattice constant $a_{2,\,interface}$ of the second material in the interface 62 between the lattice expansion layer 40 and the hydrogen dissociation and transmission layer 60 and a lattice constant $a_{2,\,surface}$ of the second material in the surface 64 of the hydrogen dissociation and transmission layer 60 may satisfy a formula (4):

$$0.98 \leq a_{2,\,surface}/a_{2,\,interface} \leq 1 \quad (4),$$

The values of the formulae $[(a_{2,\,surface} - a_{2,\,bulk})/a_{2,\,bulk}] \times 100$ and $[(a_{2,\,interface} - a_{2,\,bulk})/a_{2,\,bulk}] \times 100$ may be in a range of 1.5 to 3.6.

Here, the lattice constant $a_{2,\,interface}$ of the second material in the interface 62 means a lattice constant determined from a lattice spacing between crystal planes perpendicular to the interface 62 in or in the vicinity of the interface 62. The lattice constant $a_{2,\,surface}$ of the second material in the surface 64 means a lattice constant determined from a lattice spacing between crystal planes perpendicular to the interface 62 in or in the vicinity of the surface 64. These lattice constants can be determined based on electron diffraction patterns obtained by using a TEM. The formula (4) indicates that the crystal lattice of the second material is expanded throughout the entire hydrogen dissociation and transmission layer 60, thus allowing the prevention or reduction of the hydrogen embrittlement of the entire hydrogen dissociation and transmission layer 60.

The lattice expansion layer 40 and the hydrogen dissociation and transmission layer 60 may have the total thickness exceeding seven times of the pore diameter of the porous substrate 20. This allows the lattice expansion layer 40 and the hydrogen dissociation and transmission layer 60 to surely obstruct the pores, thus providing a satisfactory hydrogen separation performance of the hydrogen separation filter 1. From the aspect of saving the raw material cost and the manufacturing time of the hydrogen separation filter 1, the total thickness of the lattice expansion layer 40 and the hydrogen dissociation and transmission layer 60 may be 700 nm or less. From the aspect of providing the hydrogen separation performance while saving the raw material cost and the manufacturing time, the hydrogen dissociation and transmission layer 60 may have the thickness in a range of 10 nm to 350 nm.

The hydrogen separation filter 1 according to this embodiment can be manufactured by depositing the first material on the porous substrate 20 with an evaporation method to form the lattice expansion layer 40, and subsequently depositing the second material on the lattice expansion layer 40 with the evaporation method to form the hydrogen dissociation and transmission layer 60. The evaporation method has an advantage in that the amount of deposition necessary for obstructing the pores of the porous substrate 20 is smaller compared with a plating method, and the usage of the second material, which is a rare and expensive metal, can be reduced. The evaporation method has an advantage also in that the formed layers are less contaminated with impurities compared with a CVD method, and the apparatus is less expensive compared with a sputtering method.

For evacuating a deposition chamber of an evaporation apparatus, a cryo pump may be used. The evaporation deposition may be performed under a pressure in a range of $1 \times 10^{-6}$ Pa to $1 \times 10^{-4}$ Pa. It does not take an excessively long time to evacuate the deposition chamber to the pressure of $1 \times 10^{-6}$ Pa or more, allowing the hydrogen separation filter 1 to be manufactured with a satisfactory productivity. The deposition chamber with the pressure of $1 \times 10^{-4}$ Pa or less allows sufficiently reducing defects of the lattice expansion layer 40 and the hydrogen dissociation and transmission layer 60, leading to the hydrogen separation filter 1 with a satisfactory hydrogen separation performance.

II. Modified Embodiment

Figure 2:
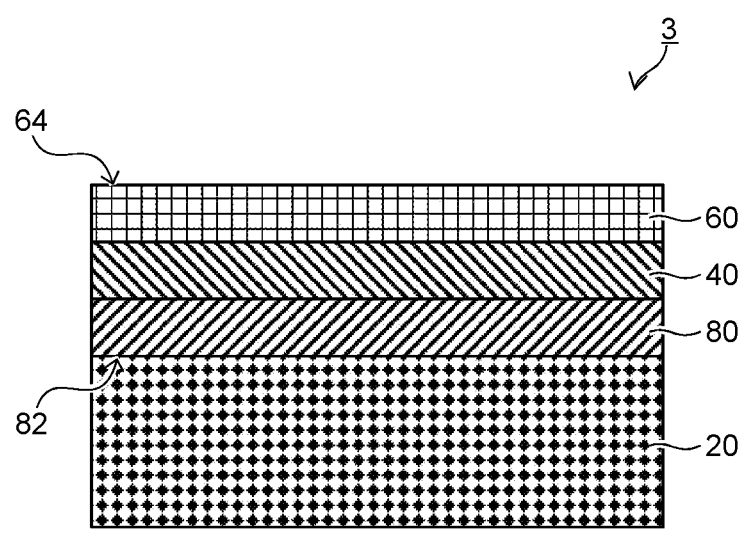
FIG. 2 is a schematic cross-sectional view of a hydrogen separation filter according to a modified embodiment.

The present disclosure is not limited to the above-described embodiment, but various kinds of changes of design are allowed within a range not departing from the spirits of the present disclosure described in the claims. For example, while the lattice expansion layer 40 is formed directly on the porous substrate 20 in the above-described embodiment, a hydrogen release layer 80 may be provided between the lattice expansion layer 40 and the porous substrate 20 as illustrated in FIG. 2. That is, the lattice expansion layer 40 may be formed indirectly on the porous substrate 20.

A hydrogen separation filter 3 according to the modified embodiment illustrated in FIG. 2 includes a porous substrate 20, a lattice expansion layer 40 formed indirectly on the porous substrate 20, a hydrogen dissociation and transmission layer 60 formed on the lattice expansion layer 40, and the hydrogen release layer 80 formed between the porous substrate 20 and the lattice expansion layer 40. In this modified embodiment, the hydrogen release layer 80 may be formed directly on the porous substrate 20, the lattice expansion layer 40 may be formed directly on the hydrogen release layer 80, and the hydrogen dissociation and transmission layer 60 may be formed directly on the lattice expansion layer 40.

Since the porous substrate 20, the lattice expansion layer 40, and the hydrogen dissociation and transmission layer 60 are similar to those in the above-described embodiment, the explanations are omitted. In this modified embodiment, the pores of the porous substrate 20 are obstructed by the hydrogen release layer 80, the lattice expansion layer 40, and the hydrogen dissociation and transmission layer 60. Therefore, the total thickness of the lattice expansion layer 40 and the hydrogen dissociation and transmission layer 60 can be reduced compared with the above-described embodiment in which the pores of the porous substrate 20 are obstructed by only the lattice expansion layer 40 and the hydrogen dissociation and transmission layer 60.

The hydrogen release layer 80 contains a third material, consists essentially of the third material, or consists of the third material. The third material is a material having a binding energy with hydrogen in a range of 230 kJ/mol H to 270 kJ/mol H. This allows hydrogen atoms to recombine to be released from the hydrogen release layer 80 in a surface 82 of the hydrogen release layer 80 (i.e., an interface 82 between the porous substrate 20 and the hydrogen release layer 80).

For example, the third material is selected from the group consisting of Cu, Ni, Rh, Pd, Ir, Pt, Fe, Co, Ru, and alloys thereof. Table 2 illustrates the binding energies with hydrogen of these metals together with the crystalline structures and the lattice constants.

TABLE 2

| Metal | Binding Energy with Hydrogen [kJ/molH] | Crystalline Structure | Lattice Constant of Bulk Material [nm] |
|---|---|---|---|
| Cu | 236 | fcc | 0.36147 |
| Ni | 261 | fcc | 0.35238 |
| Rh | 255 | fcc | 0.37156 |
| Pd | 260 | fcc | 0.38898 |
| Ir | 264 | fcc | 0.38394 |
| Pt | 243 | fcc | 0.39231 |
| Fe | 260 | bcc | 0.28664 |
| Co | 250 | hcp | a 0.2507 |
|  |  |  | c 0.4069 |
| Ru | 256 | hcp | a 0.2704 |
|  |  |  | c 0.4282 |

The third material may be a less expensive material than the first material and the second material. As described above, in the hydrogen separation filter 3 according to this modified embodiment, the pores of the porous substrate 20 are obstructed by the hydrogen release layer 80, the lattice expansion layer 40, and the hydrogen dissociation and transmission layer 60. Therefore, the total thickness of the lattice expansion layer 40 and the hydrogen dissociation and transmission layer 60 can be reduced compared with the hydrogen separation filter 1 according to the above-described embodiment in which the pores of the porous substrate 20 are obstructed by only the lattice expansion layer 40 and the hydrogen dissociation and transmission layer 60. By forming the hydrogen release layer 80 with the third material which is less expensive than the first material and the second material, the raw material cost of the hydrogen separation filter 3 can be saved.

The third material may have the same crystalline structure as the first material and the second material. A third bulk material having the same composition and the same crystalline structure as the third material may have a lattice constant $a_{3,\ bulk}$ satisfying a formula (5):

$$0.8 a_{1,\ bulk} \leq a_{3,\ bulk} \leq 1.0 a_{1,\ bulk} \quad (5).$$

This allows compensating for a stress due to a difference between the lattice constant $a_{1,\ bulk}$ of the first bulk material and the lattice constant $a_{2,\ bulk}$ of the second bulk material.

For example, when the first material is Ag, and the second material is Pd, the third material may be Cu or Ni, especially, may be Cu, and when the first material is Nb, W, or Mo, and the second material is V, the third material may be Fe.

The lattice expansion layer 40, the hydrogen dissociation and transmission layer 60, and the hydrogen release layer 80 may have a total thickness exceeding seven times of the pore diameter of the porous substrate 20. This allows the lattice expansion layer 40, the hydrogen dissociation and transmission layer 60, and the hydrogen release layer 80 to surely obstruct the pores, thus providing a satisfactory hydrogen separation performance of the hydrogen separation filter 3. From the aspect of saving the raw material cost and the manufacturing time of the hydrogen separation filter 3, the total thickness of the lattice expansion layer 40, the hydrogen dissociation and transmission layer 60, and the hydrogen release layer 80 may be 700 nm or less. From the aspect of providing the hydrogen separation performance while saving the raw material cost and the manufacturing time of the hydrogen separation filter 3, the hydrogen dissociation and transmission layer 60 may have the thickness in a range of 10 nm to 350 nm.

The hydrogen release layer 80 may have a single layer structure, or may have a multilayer structure including two or more layers.

The hydrogen separation filter 3 can selectively transmit hydrogen as follows. On the surface 64 of the hydrogen dissociation and transmission layer 60, hydrogen molecules are dissociatively adsorbed and hydrogen atoms are generated. The hydrogen atoms diffuse in the hydrogen dissociation and transmission layer 60, the lattice expansion layer 40, and the hydrogen release layer 80, then recombine to form hydrogen molecules on the interface 82 between the hydrogen release layer 80 and the porous substrate 20, and leave the hydrogen release layer 80. The hydrogen molecules pass through the porous substrate 20 and then leave the hydrogen separation filter 3.

The hydrogen separation filter 3 according to this modified embodiment can be manufactured by a method including a step of forming the hydrogen release layer 80 by depositing the third material on the porous substrate 20 with an electroless plating method, a step of forming the lattice expansion layer 40 by depositing the first material on the hydrogen release layer 80 with the evaporation method, and a step of forming the hydrogen dissociation and transmission layer 60 by depositing the second material on the lattice expansion layer 40 with the evaporation method. In this method, the step of forming the lattice expansion layer 40 and the step of forming the hydrogen dissociation and transmission layer 60 can be collectively referred to as a step of sequentially depositing the first material and the second material indirectly on the porous substrate 20.

In the step of forming the hydrogen release layer 80, any electroless plating method may be used depending on the type of the third material. A catalyst for the electroless plating may be provided to the porous substrate 20 in advance. Since a deposition rate is generally higher in the electroless plating method than in the evaporation method, the hydrogen separation filter 3 according to the modified embodiment can be manufactured in a shorter manufacturing time than that of the hydrogen separation filter 1 according to the above-described embodiment.

When the third material is Cu, a copper plating solution used for the electroless plating may contain copper sulfate, formaldehyde, and polyethylene glycol. The copper plating solution may contain polyethylene glycol with a concentration in a range of 20 ppm to 40 ppm based on the total weight of the copper plating solution. The concentration of polyethylene glycol of 20 ppm or more can provide the hydrogen separation filter 3 with a satisfactory hydrogen separation performance. The concentration of polyethylene glycol of 40 ppm or less provides a sufficiently high deposition rate of Cu, thus allowing the manufacture of the hydrogen separation filter 3 with a satisfactory productivity.

Since the method of forming the lattice expansion layer 40 and the hydrogen dissociation and transmission layer 60 with the evaporation method is similar to the method in the hydrogen separation filter 1 according to the above-described embodiment, the detailed description is omitted.

EXAMPLES

While the following specifically describes the present disclosure by examples, the present disclosure is not limited to these examples.

I. Hydrogen Separation Filter Including Porous Substrate, Lattice Expansion Layer, and Hydrogen Dissociation and Transmission Layer in this Order (1) Producing Hydrogen Separation Filter Examples 1 to 5

A porous ceramic substrate (N-99EP manufactured by Nishimura Advanced Ceramics Co., Ltd., mean pore size 100 nm, porosity 35%, hereinafter simply referred to as "substrate") containing alumina as a main component was placed in a deposition chamber of an evaporation apparatus. The deposition chamber was provided with evaporation cells of Ag and Pd, and connected to a rotary pump and a cryo pump. The chamber was evacuated to about 40 Pa by the rotary pump, and subsequently, evacuated to the pressures illustrated in Table 3 by the cryo pump. Ag was evaporation-deposited on the substrate to form an Ag layer, and subsequently, Pd was evaporation-deposited on the Ag layer to form a Pd layer. Thus, the hydrogen separation filters were produced. A total thickness of the Ag layer and the Pd layer was about 700 nm.

Comparative Example

A hydrogen separation filter was produced similarly to Example 4 except that a Pd layer having a thickness of about 700 nm was formed directly on the substrate without forming an Ag layer.

(2) Measuring Lattice Constant

For the hydrogen separation filters of Examples 1 to 5, electron diffraction patterns of the Pd layer were obtained in and in the vicinity of an interface between the Pd layer and the Ag layer, in and in the vicinity of a surface of the Pd layer, and in an intermediate position of them by using a TEM. From these electron diffraction patterns, lattice spacings between Pd(110) planes perpendicular to the interface between the Ag layer and the Pd layer were determined at the respective positions. By using these lattice spacings, a Pd lattice constant $a_{Pd,\ interface}$ in the interface between the Ag layer and the Pd layer, a Pd lattice constant $a_{Pd,\ surface}$ in a surface of the Pd layer, and a lattice constant in the intermediate position were obtained, and an average value $a_{pd}$ of them was calculated. A ratio $a_{Pd,\ surface}/a_{Pd,\ interface}$ was also calculated. For the hydrogen separation filter of the comparative example, similarly, a Pd lattice constant $a_{Pd,\ interface}$ in the interface between the substrate and the Pd layer, a Pd lattice constant $a_{Pd,\ surface}$ in a surface of the Pd layer, and a lattice constant in the intermediate position were obtained, and an average value $a_{pd}$ of them was calculated. Furthermore, a ratio $a_{Pd, surface}/a_{Pd, interface}$ was calculated. Table 3 illustrates the results.

In examples 1 to 5, the lattice constant $a_{pd}$ was larger than a bulk Pd lattice constant $a_{pd, bulk}$ (0.38898 nm). Meanwhile, in Comparative Example, the lattice constant $a_{pd}$ was approximately the same as the bulk Pd lattice constant $a_{pd, bulk}$. The result indicates that the Pd layer formed on the Ag layer has the Pd crystal lattice expanded in a direction parallel to the interface between the Ag layer and the Pd layer. In examples 1 to 5, $[(a_{pd}-a_{pd, bulk})/a_{pd, bulk}]\times100$, $[(a_{pd, surface}-a_{pd, bulk})/a_{pd, bulk}]\times100$, and $[(a_{pd, interface}-a_{pd, bulk})/a_{pd, bulk}]\times100$ were in a range of 1.5 to 3.6.

In examples 1 to 5, the ratio $a_{Pd, surface}/a_{Pd, interface}$ was in a range of 0.98 to 1, indicating that the Pd crystal lattice was sufficiently expanded throughout the entire Pd layer.

(3) Evaluation of Void of Pd Layer

Auger electron spectroscopy was used to obtain surface elemental mapping images of the hydrogen separation filters of Examples 1 to 5 and Comparative Example. In any of the hydrogen separation filters, only Pd was detected, and neither Ag nor Al was detected. The results confirmed that the Pd layer was not provided with a void in any of the hydrogen separation filters.

(4) Evaluation of Hydrogen Separation Performance

The hydrogen separation filters of Examples 1 to 5 and Comparative Example were heated to 100° C., and a mixed gas of hydrogen and nitrogen (hydrogen 1%) was allowed to pass through the hydrogen separation filters. Hydrogen concentrations Co in the mixed gas before passing through the hydrogen separation filters and hydrogen concentrations C of the mixed gas after passing through the hydrogen separation filters were measured, and hydrogen separation factors S were calculated based on a formula below. Table 3 illustrates the results.

$$S=(C/(1-C))/(C_0/(1-C_0))$$

The hydrogen separation factors of the hydrogen separation filters of Examples 1 to 5 were larger than the hydrogen separation factor of the hydrogen separation filter of Comparative Example. This result indicates that the embrittlement of the Pd layer was prevented or reduced by the expansion of the Pd crystal lattice, thereby improving the hydrogen separation performance at the low temperature such as 100° C.

Figure 3:
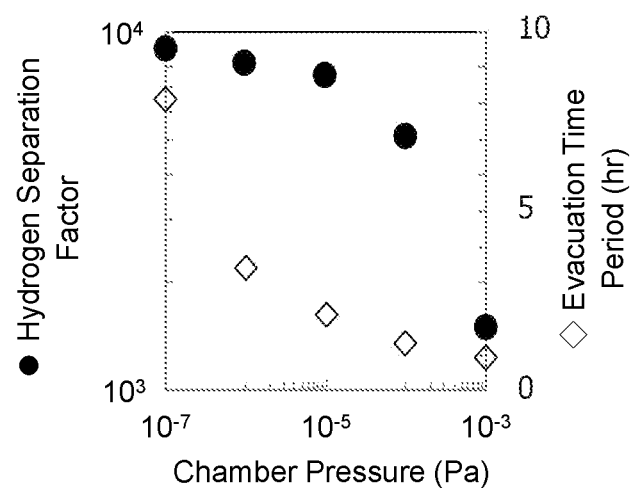
FIG. 3 is a graph in which a time period taken for an air evacuation of a chamber and a hydrogen separation factor of the hydrogen separation filter are plotted relative to a chamber pressure when an Ag layer and a Pd layer are formed in Examples 1 to 5.

(5) Relation Between Deposition Condition, and Hydrogen Separation Performance and Productivity FIG. 3 is a graph in which a time period taken for an air evacuation of a chamber and a hydrogen separation factor of the hydrogen separation filter are plotted relative to a chamber pressure when an Ag layer and a Pd layer are formed. The especially high hydrogen separation factors were obtained when the chamber pressure was $1\times10^{-4}$ Pa or less. Meanwhile, the air evacuation of the chamber was completed in sufficiently short time period when the chamber pressure was $1\times10^{-6}$ Pa or more. This result indicates that evaporation under the pressure in a range of $1\times10^{-6}$ Pa to $1\times10^{-4}$ Pa is advantageous in the manufacture.

TABLE 3

| | Ag Layer | Chamber Pressure [Pa] | $a_{pd}$ [Å] | $a_{pd, interface}$ [Å] | $a_{pd, surface}$ [Å] | $a_{pd, surface}/a_{pd, interface}$ [−] | S [−] |
|---|---|---|---|---|---|---|---|
| Example 1 | Present | $1\times10^{-7}$ | 4.02 | 4.03 | 4.01 | 0.995 | 8901 |
| Example 2 | Present | $1\times10^{-6}$ | 4.01 | 4.02 | 4.01 | 0.998 | 8151 |
| Example 3 | Present | $1\times10^{-5}$ | 3.99 | 4.01 | 3.98 | 0.993 | 7516 |
| Example 4 | Present | $1\times10^{-4}$ | 4.00 | 4.01 | 3.97 | 0.990 | 5111 |
| Example 5 | Present | $1\times10^{-3}$ | 3.99 | 4.02 | 3.95 | 0.983 | 1498 |
| Comparative Example | Absent | $1\times10^{-4}$ | 3.89 | 3.89 | 3.89 | 1.000 | 893 |

II. Hydrogen Separation Filter Including Porous Substrate, Hydrogen Release Layer, Lattice Expansion Layer, and Hydrogen Dissociation and Transmission Layer in this Order (1) Producing Hydrogen Separation Filter Examples 6 to 10 i) Measuring Cu Deposition Rate by Electroless Plating

A porous ceramic substrate (N-99EP manufactured by Nishimura Advanced Ceramics Co., Ltd., mean pore size 100 nm, porosity 35%, hereinafter simply referred to as "substrate") containing alumina as a main component was immersed in an aqueous solution of tin chloride, and subsequently, washed with a pure water. Next, the substrate was immersed in an aqueous solution of palladium chloride, and subsequently, washed with a pure water. Thus, a palladium catalyst was provided to the substrate.

Electroless plating solutions containing copper sulfate, formaldehyde, and polyethylene glycol (PEG) were prepared. PEG concentrations in the electroless plating solutions were as illustrated in Table 4. The substrate with the palladium catalyst was immersed in the electroless plating solutions for a predetermined period, thereby depositing Cu on the substrate. The deposition rate of Cu was calculated by dividing a difference between Cu weights before and after the deposition by the immersion period. Table 4 illustrates the results.

ii) Production of Hydrogen Separation Filter

A substrate with the palladium catalyst was prepared similarly to i). The substrate with the palladium catalyst was immersed in the plating solution used in i) for a predetermined period, thereby depositing Cu on the substrate to form a Cu layer.

The substrate on which the Cu layer was formed was placed in a deposition chamber of an evaporation apparatus. The deposition chamber was provided with evaporation cells of Ag and Pd, and connected to a rotary pump and a cryo pump. The chamber was evacuated to about 40 Pa by the rotary pump, and subsequently, evacuated to the pressure of $1\times10^{-4}$ Pa by the cryo pump. Ag was evaporation-deposited on the Cu layer to form an Ag layer, and subsequently, Pd was evaporation-deposited on the Ag layer to form a Pd layer. Thus, the hydrogen separation filter was produced. A total thickness of the Cu layer, the Ag layer, and the Pd layer was about 700 nm.

(2) Measuring Lattice Constant

For the hydrogen separation filters of Examples 6 to 10, electron diffraction patterns of the Pd layer were obtained in and in the vicinity of an interface between the Pd layer and the Ag layer, in and in the vicinity of a surface of the Pd layer, and in an intermediate position of them by using a TEM. From these electron diffraction patterns, lattice spacings between Pd(110) planes perpendicular to the interface between the Ag layer and the Pd layer were determined at the respective positions. Pd lattice constants at the respective positions were calculated from the lattice spacings, and an average value $a_{pd}$ of them was calculated. In any of Examples 6 to 10, the lattice constant $a_{pd}$ was about 1.03 times of the bulk Pd lattice constant $a_{pd,\ bulk}$ (0.38898 nm).

(3) Evaluation of Hydrogen Separation Performance

The hydrogen separation performances of the hydrogen separation filters of Examples 6 to 10 were evaluated similarly to Examples 1 to 5. Table 4 illustrates the results.

Figure 4:
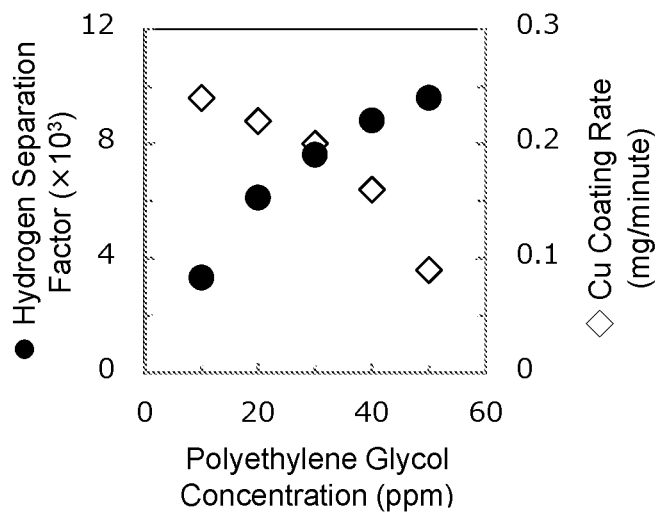
FIG. 4 is a graph in which a Cu deposition rate and a hydrogen separation factor of the hydrogen separation filter are plotted relative to a polyethylene glycol concentration of an electroless plating solution used in Examples 6 to 10.

(4) Relation Between PEG Concentration, and Hydrogen Separation Performance and Productivity FIG. 4 is a graph in which a Cu deposition rate and a hydrogen separation factor of the hydrogen separation filter are plotted relative to a PEG concentration of an electroless plating solution. The especially high hydrogen separation factors were obtained when the PEG concentration was 20 ppm or more. The Cu deposition rate was sufficiently high when the PEG concentration was 40 ppm or less. This result indicates that using an electroless copper plating solution containing PEG with the concentration in a range of 20 ppm to 40 ppm is advantageous in the manufacture.

TABLE 4

| | PEG Concentration [ppm] | Deposition Rate [mg/minute] | Hydrogen Separation Factor S [—] |
|---|---|---|---|
| Example 6 | 10 | 0.24 | 3339 |
| Example 7 | 20 | 0.22 | 6127 |
| Example 8 | 30 | 0.20 | 7635 |
| Example 9 | 40 | 0.16 | 8820 |
| Example 10 | 50 | 0.09 | 9607 |

What is claimed is:

1. A hydrogen separation filter comprising:
a porous substrate;
a lattice expansion layer formed on the porous substrate, the lattice expansion layer containing a first material; and
a hydrogen dissociation and transmission layer formed on the lattice expansion layer, the hydrogen dissociation and transmission layer containing a second material selected from the group consisting of Pd, V, Ta, Ti, Nb, and alloys thereof,
wherein the first material and the second material have a same crystalline structure, and
wherein a lattice constant $a_{1,\ bulk}$ of a first bulk material having a same composition and a same crystalline structure as the first material and a lattice constant $a_{2,\ bulk}$ of a second bulk material having a same composition and a same crystalline structure as the second material satisfy a formula (1):

$$1.03 a_{2,\ bulk} \leq a_{1,\ bulk} \leq 1.15 a_{2,\ bulk} \tag{1}$$

2. The hydrogen separation filter according to claim 1, wherein the second material has a lattice constant $a_2$ satisfying a formula (2):

$$a_{2,\ bulk} < a_2 \tag{2}$$

the lattice constant $a_2$ being obtained from a lattice spacing between crystal planes perpendicular to an interface between the lattice expansion layer and the hydrogen dissociation and transmission layer.

3. The hydrogen separation filter according to claim 1, wherein the second material has a lattice constant $a_2$ satisfying a formula (3):

$$1.5 \leq [(a_2 - a_{2,\ bulk})/a_{2,\ bulk}] \times 100 \leq 3.6 \tag{3}$$

the lattice constant $a_2$ being obtained from a lattice spacing between crystal planes perpendicular to an interface between the lattice expansion layer and the hydrogen dissociation and transmission layer.

4. The hydrogen separation filter according to claim 1, wherein a lattice constant $a_{2,\ interface}$ of the second material in an interface between the lattice expansion layer and the hydrogen dissociation and transmission layer and a lattice constant $a_{2,\ surface}$ of the second material in a surface of the hydrogen dissociation and transmission layer satisfy a formula (4):

$$0.98 \leq a_{2,\ surface}/a_{2,\ interface} \leq 1 \tag{4}$$

the lattice constant $a_{2,\ interface}$ being obtained from a lattice spacing between crystal planes perpendicular to the interface, and the lattice constant $a_{2,\ surface}$ being obtained from a lattice spacing between crystal planes perpendicular to the interface.

5. The hydrogen separation filter according to claim 1, wherein the hydrogen dissociation and transmission layer has a thickness in a range of 10 nm to 350 nm.

6. The hydrogen separation filter according to claim 1, wherein the first material is Ag, Au, or Al, and
wherein the second material is Pd.

7. The hydrogen separation filter according to claim 6, wherein the first material is Ag.

8. The hydrogen separation filter according to claim 1, wherein the lattice expansion layer and the hydrogen dissociation and transmission layer have a total thickness exceeding seven times of a pore diameter of the porous substrate.

9. The hydrogen separation filter according to claim 1, further comprising
a hydrogen release layer containing a third material and formed between the porous substrate and the lattice expansion layer,
wherein the third material has a binding energy with hydrogen in a range of 230 kJ/mol H to 270 kJ/mol H.

10. The hydrogen separation filter according to claim 9, wherein the third material has a same crystalline structure as the first material and the second material.

11. The hydrogen separation filter according to claim 10, wherein a lattice constant $a_{3,\ bulk}$ of a third bulk material having a same composition and a same crystalline structure as the third material satisfies a formula (5):

$$0.8 a_{1,\ bulk} \leq a_{3,\ bulk} \leq 1.0 a_{1,\ bulk} \tag{5}$$

12. The hydrogen separation filter according to claim 9, wherein the first material is Ag,
wherein the second material is Pd, and
wherein the third material is Cu or Ni.

13. The hydrogen separation filter according to claim 9, wherein the first material is Nb, W, or Mo,
wherein the second material is V, and
wherein the third material is Fe.

14. A method for manufacturing the hydrogen separation filter according to claim 1, the method comprising depositing the first material and the second material sequentially on the porous substrate with an evaporation method under a pressure in a range of $1\times10^{-6}$ Pa to $1\times10^{-4}$ Pa.

15. A method for manufacturing the hydrogen separation filter according to claim 9, the method comprising:
- forming the hydrogen release layer by depositing Cu as the third material on the porous substrate with an electroless plating method using a copper plating solution containing polyethylene glycol with a concentration in a range of 20 ppm to 40 ppm;
- forming the lattice expansion layer by depositing the first material on the hydrogen release layer with an evaporation method; and
- forming the hydrogen dissociation and transmission layer by depositing the second material on the lattice expansion layer with the evaporation method.

* * * * *